(12) United States Patent
Ohki et al.

(10) Patent No.: US 9,922,406 B2
(45) Date of Patent: Mar. 20, 2018

(54) INFORMATION PROCESSING APPARATUS, INFORMATION PROCESSING METHOD, AND INFORMATION PROCESSING PROGRAM FOR SYNTHESIZING A MODIFIED STROKE

(71) Applicant: SONY CORPORATION, Tokyo (JP)

(72) Inventors: Yoshihito Ohki, Tokyo (JP); Yasuyuki Koga, Kanagawa (JP); Tsubasa Tsukahara, Tokyo (JP); Ikuo Yamano, Tokyo (JP); Hiroyuki Mizunuma, Tokyo (JP); Miwa Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 14/897,840

(22) PCT Filed: May 15, 2014

(86) PCT No.: PCT/JP2014/002561
§ 371 (c)(1),
(2) Date: Dec. 11, 2015

(87) PCT Pub. No.: WO2014/207985
PCT Pub. Date: Dec. 31, 2014

(65) Prior Publication Data
US 2016/0125578 A1    May 5, 2016

(30) Foreign Application Priority Data

Jun. 25, 2013  (JP) ................. 2013-133201

(51) Int. Cl.
*G06K 9/00*  (2006.01)
*G06T 5/00*  (2006.01)
(Continued)

(52) U.S. Cl.
CPC .......... *G06T 5/006* (2013.01); *G06K 9/00409* (2013.01); *G06K 9/00422* (2013.01); *G06K 9/52* (2013.01); *G06T 3/0006* (2013.01)

(58) Field of Classification Search
CPC ............ G06F 3/04883; G06K 9/00409; G06K 9/00422; G06K 2209/01; G06K 9/222; G06T 3/0006; G06T 5/006
See application file for complete search history.

(56) References Cited

U.S. PATENT DOCUMENTS 5,911,005 A * 6/1999 Uchiyama ............ G06K 9/4647
382/177
6,333,996 B1 * 12/2001 Kato ................... G06F 3/04883
382/188
(Continued)

FOREIGN PATENT DOCUMENTS

JP    2009-116877    5/2009

OTHER PUBLICATIONS

Mori, et al., "Chapter 3 Normalization", Optical Character Recognition, Jan. 1, 1999, pp. 60-104, Wiley.
(Continued)

*Primary Examiner* — Li Liu
(74) *Attorney, Agent, or Firm* — Paratus Law Group, PLLC

(57) ABSTRACT

There is provided an image processing apparatus including an input device configured to receive a stroke input, and a display controller configured to control a displaying of a modified stroke, wherein the modified stroke is synthesized based on characteristic parameters of the received stroke input and characteristic parameters of a reference stroke that has been matched to the received stroke input.

22 Claims, 9 Drawing Sheets

(51) Int. Cl.
*G06K 9/52* (2006.01)
*G06T 3/00* (2006.01)

(56) References Cited

U.S. PATENT DOCUMENTS

| | | | | |
|---|---|---|---|---|
| 6,718,060 | B1* | 4/2004 | Yokota | G06K 9/6814 382/187 |
| 6,798,907 | B1* | 9/2004 | Clary | G06F 3/04883 382/187 |
| 2004/0140977 | A1 | 7/2004 | Hakamada | |
| 2009/0116744 | A1 | 5/2009 | Woo et al. | |
| 2013/0136377 | A1* | 5/2013 | Luo | G06T 5/00 382/275 |
| 2014/0289238 | A1* | 9/2014 | Fume | G06F 17/214 707/728 |

OTHER PUBLICATIONS

Ernesto, et al., "Multimedia Techniques for Device and Ambient Intelligence", Jan. 1, 2009, pp. 61-63, Springer.

Zhu, et al., "Calligraphic Beautification of Handwritten Chinese Characters: A Patternized Approach to Handwriting Transfiguration", Proc. of 11$^{th}$ Int. Conference on Frontiers in Handwriting Recognition—ICFHR 2008, Aug. 21, 2008, pp. 135-140, Montreal, Canada.

Li, et al., "Calligraphy Beautification Method for Chinese Handwritings", 2012 Fourth International Conference on Digital Home, Nov. 23, 2012, pp. 122-127, IEEE.

Zitnick, "Handwriting Beautification Using Token Means", ACM Transactions on Graphics, Jul. 1, 2013, pp. 1-8, vol. 32—No. 4, Article 53.

Sep. 27, 2016, JP communication issued for related JP application No. 2013-133201.

* cited by examiner

INFORMATION PROCESSING APPARATUS, INFORMATION PROCESSING METHOD, AND INFORMATION PROCESSING PROGRAM FOR SYNTHESIZING A MODIFIED STROKE

CROSS REFERENCE TO PRIOR APPLICATION

This application is a National Stage Patent Application of PCT International Patent Application No. PCT/JP2014/002561 (filed on May 15, 2014) under 35 U.S.C. § 371, which claims priority to Japanese Patent Application No. 2013-133201 (filed on Jun. 25, 2013), which are all hereby incorporated by reference in their entirety.

TECHNICAL FIELD

The present disclosure relates to an information processing apparatus, an information processing method, and an information processing program for formatting handwritten input characters and figures (hereinafter, collectively referred to as marks).

BACKGROUND ART

From the past, in a handwritten character input and a pattern recognition of a handwritten input character, a series of input strokes (unicursal line constituting mark) undergo recognition processing at a timing at which a certain interval is temporally or spatially caused and displayed using a font prepared in a system as text data in most cases.

Further, Patent Literature 1 discloses a technique of cutting out a handwritten input character string for each character and performing a correction of a character tilt, an interval adjustment, and the like, to thus improve a character recognition rate.

CITATION LIST

Patent Literature

[PTL 1]
Japanese Patent No. 4741977

SUMMARY

Technical Problem

However, even when the same content as that input by a user is displayed, there is a large difference in appearance between a handwritten character and a character in a rendered font. With the rendered font, there has been a problem that characteristics such as a nuance of an input and a handwriting tendency of a writer will be lost, and a sense of unity as a whole will also be lost in a document combined with handwritten figures and the like.

In addition, there have been various problems in the formatting of a handwritten input mark.

In view of the circumstances as described above, an object of the present disclosure is to provide an information processing apparatus, an information processing method, and an information processing program with which handwritten input marks can be formatted appropriately.

Solution to Problem

According to an aspect of the present disclosure, there is provided an image processing apparatus including: an input device configured to receive a stroke input; and a display controller configured to control a displaying of a modified stroke, wherein the modified stroke is synthesized based on characteristic parameters of the received stroke input and characteristic parameters of a reference stroke that has been matched to the received stroke input.

According to another aspect of the present disclosure, there is provided an image processing method including: controlling a reception of a stroke input; controlling a determination of characteristic parameters of the received stroke input; controlling a synthesizing of a modified stroke based on the characteristic parameters of the received stroke input and characteristic parameters of a reference stroke that has been matched to the received stroke input; and controlling the modified stroke to be displayed.

According to another aspect of the present disclosure, there is provided a non-transitory computer-readable medium having embodied thereon a program, which when executed by a computer causes the computer to perform an image processing method, the method including: controlling a reception of a stroke input; controlling a determination of characteristic parameters of the received stroke input; controlling a synthesizing of a modified stroke based on the characteristic parameters of the received stroke input and characteristic parameters of a reference stroke that has been matched to the received stroke input; and controlling the modified stroke to be displayed.

According to another aspect of the present disclosure, there is provided an image processing system including: a terminal device configured to receive a stroke input and control a displaying of a modified stroke; and a server device configured to match a reference stroke to the received stroke input and synthesize the modified stroke based on characteristic parameters of the received stroke input and characteristic parameters of the matched reference stroke.

Effect of Invention

As described above, according to embodiments of the present disclosure, a handwritten input mark can be formatted appropriately.

DESCRIPTION OF EMBODIMENTS

Hereinafter, embodiments of the present disclosure will be described with reference to the drawings.

First Embodiment

[Outline]

In the present disclosure, in formatting a handwritten input stroke (input stroke data) based on a result of a pattern recognition, a semi-formatted stroke is generated while leaving characteristics of the input stroke instead of fully replacing it by an ideal shape stored on a system side. As a result, display of easy-to-read characters and figures (marks) is realized while leaving a handwriting nuance and texture. It should be noted that in the present disclosure, it can also be said that a handwritten input stroke (input stroke data) and an ideal shape stored on the system side (reference stroke data) are synthesized to generate a semi-formatted stroke.

It should be noted that since the present disclosure presupposes that a pattern recognition of characters and figures (marks) is performed, recognized data can of course be used as general text data in a search, a language analysis, and the like.

[Difference from Typical Technique]

In general, in formatting a handwritten input stroke, a correction of a distance or curvature of consecutive sampling points is performed locally before a pattern recognition of the stroke. Specifically, the formatting performed herein is assumed to be used as preprocessing for improving a character recognition processing accuracy.

In contrast, in the present disclosure, a handwritten input stroke (mark) is corrected based on a pattern recognition result of the stroke and formatted to become readable, and thus an object and method differ from those of the typical technique.

[Structure]

Figure 1:
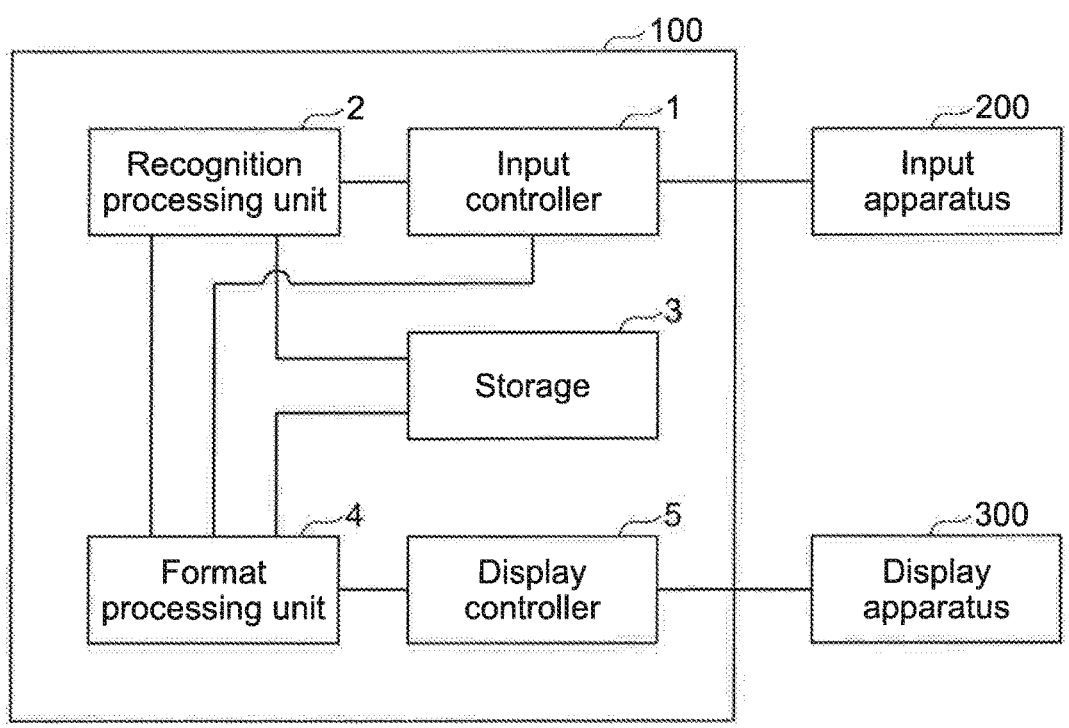
FIG. 1 A structural diagram showing a structure of an information processing apparatus according to an embodiment.

Next, a structure of an information processing apparatus of an embodiment will be described. FIG. 1 is a structural diagram showing the structure of the information processing apparatus according to an embodiment.

The information processing apparatus 100 includes an input controller 1, a recognition processing unit 2, a storage 3, a format processing unit 4, and a display controller 5. The information processing apparatus 1 is used with an input apparatus 200 and a display apparatus 300.

The input apparatus 200 is a touchpad or the like and accepts, as a stroke, a handwritten input of a user made by a finger, a stylus pen, and the like. It should be noted that the input apparatus 200 may be anything as long as it can accept a handwritten input of the user and may be, for example, a mouse and a pen tablet.

The input controller 1 controls the input apparatus 200 and accepts input data input to the input apparatus 200 by the user.

The recognition processing unit 2 recognizes what the data input by the user is by a known method for a character recognition or figure recognition based on a stroke as the input data accepted by the input controller 1.

The storage 3 stores in advance recognition data (including dictionary for word recognition) used by the recognition processing unit 2 in performing the character recognition or figure recognition and formatting example data (reference stroke data) that the format processing unit 4 needs to carry out processing of semi-formatting the input data. Specifically, the storage 3 is constituted of a hard disk drive, a nonvolatile memory, and the like.

The format processing unit 4 performs semi-formatting by a correction of the input data based on the input data supplied from the input controller 1, the pattern recognition result (e.g., character code in case of character recognition) of the input data supplied from the recognition processing unit 2, the formatting example data taken out from the storage 3, and the correction coefficient k. Details of the processing of the format processing unit 4 will be described later.

The display controller 5 controls the display apparatus 300 to display on a screen thereof the semi-formatted data semi-formatted by the format processing unit 4.

The display apparatus 300 is, for example, a liquid crystal display or an organic EL (Electro Luminescence) display and displays formatted input data under control of the display controller 5.

It should be noted that the input controller 1, the recognition processing unit 2, the format processing unit 4, and the display controller 5 may be realized as functional blocks of a computer including a CPU (Central Processing Unit) and the storage 3 by the CPU executing information processing programs stored in the storage 3.

Heretofore, the structure of the information processing apparatus 100 has been described.

Modified Example 1 (Structure as Electronic Apparatus)

In the descriptions above, the information processing apparatus 100 is an apparatus different from the input apparatus 200 and the display apparatus 300. However, the structure is not limited thereto, and an electronic apparatus 400 in which the information processing apparatus 100, the input apparatus 200, and the display apparatus 300 are integrated may also be used. In this case, a touch panel in which a transparent touchpad used as the input apparatus 200 is placed above the screen of the display apparatus 300 and integrated may be structured. An example of the electronic apparatus including a touch panel is a tablet PC (Personal Computer).

Modified Example 2 (Structure as Server on Cloud)

Figure 2:
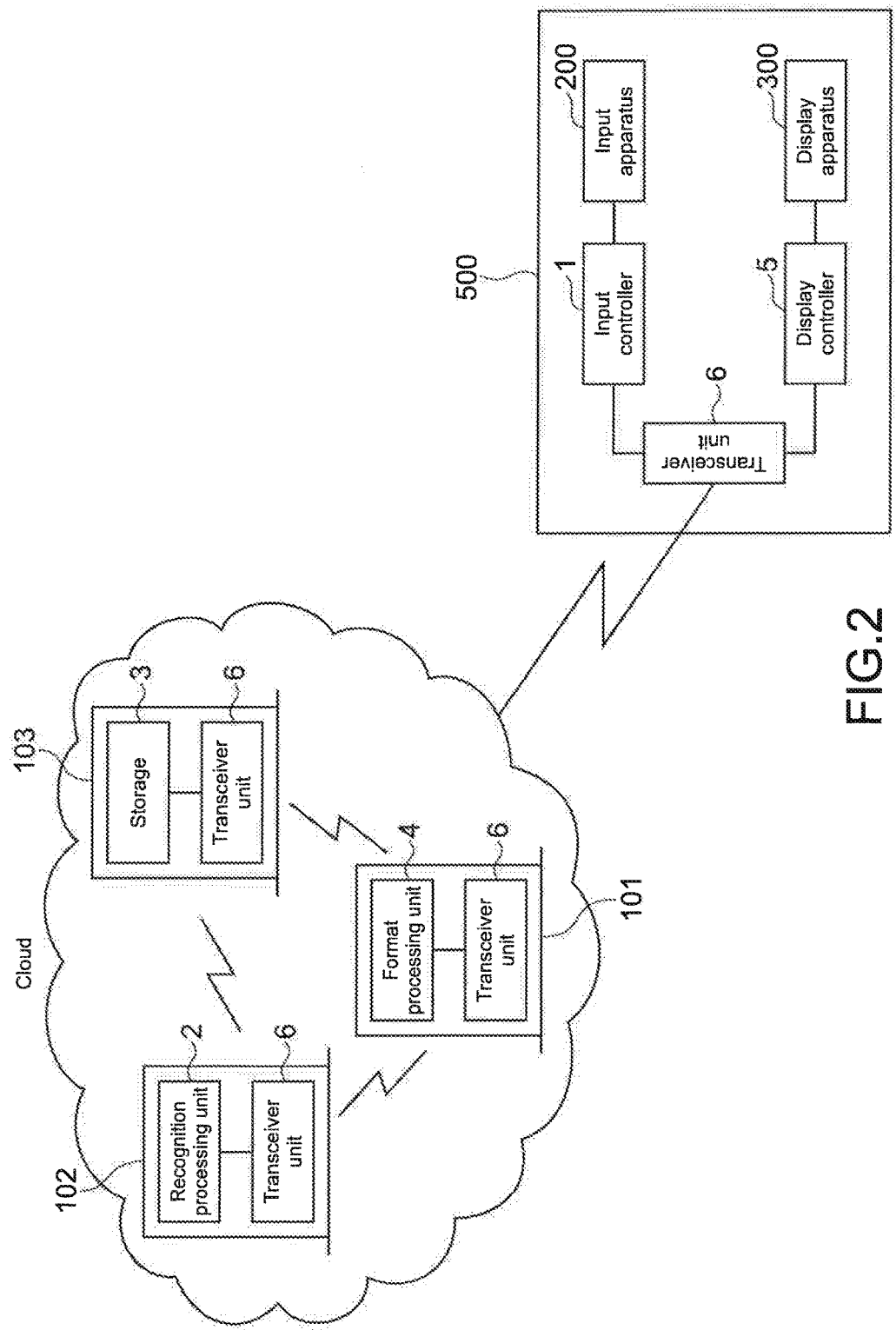
FIG. 2 A structural diagram showing another structure of the information processing apparatus according to an embodiment.

The block that assumes the semi-formatting processing of an embodiment of the present disclosure is the format processing unit 4. In this regard, as shown in FIG. 2, for example, the information processing apparatus of the present disclosure may be a server 101 on a cloud that has the functional block of the format processing unit 4. In this case, essential structures of the server 101 are the format processing unit 4 and a transceiver unit 6. The server 101 is used with a terminal apparatus 500 in hand of the user, that includes the input apparatus 200 and the display apparatus 300.

The recognition processing unit 2 may be in the terminal apparatus 500, another server 102 on the cloud, or the server 101. The storage 3 may also be in another server 103 on the cloud or the server 101. It should be noted that the cloud used herein refers to a server group that provides various services on the Internet and is also referred to as cloud computing environment.

The server 101 receives input data handwritten-input by the user from the terminal apparatus 500. The server 101 also receives a pattern recognition result (e.g., character code) of the input data from the recognition processing unit 2 mounted on the terminal apparatus 500, another server on the cloud, or the same server 101. Then, the format processing unit 4 uses the correction coefficient k and the formatting example data taken out from the storage 3 to perform semi-formatting of the input data. The semi-formatted data semi-formatted by the format processing unit 4 is transmitted to the terminal apparatus 500 by the transceiver unit.

[Basic Idea of Semi-Formatting Processing]

Figure 3:
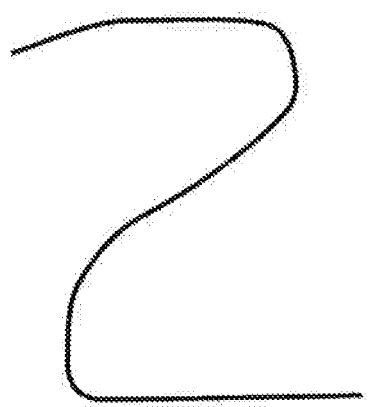
FIG. 3 A diagram showing an example of a stroke input to an input apparatus 200 by a handwritten input of a user.

Next, the basic idea of the semi-formatting processing will be described. Here, descriptions will be given assuming that a stroke as shown in FIG. 3 has been input to the input apparatus 200 by a handwritten input of the user and a character recognition is carried out by the recognition processing unit 2.

First, based on the input data input by the user, the recognition processing unit 2 performs a character recognition and selects a candidate that is highly likely a most appropriate recognition result from a plurality of recognition candidates. Here, the pattern recognition is performed assuming that the input data is an Arabic numeral "2". It should be noted that a known method only needs to be used as the method for the recognition processing carried out by the recognition processing unit 2. The same holds true for recognitions of English cursive writing and Chinese characters. The semi-formatting processing of the present disclosure presupposes accurate recognition processing.

Figure 4:
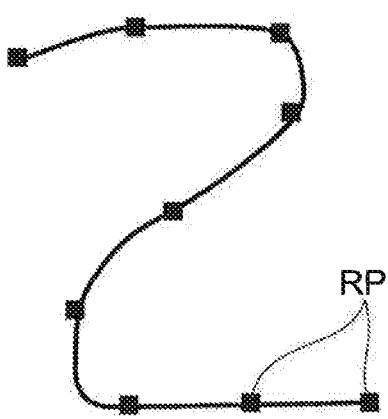
FIG. 4 A diagram showing a state where a plurality of representative points RPs are extracted as characteristic parameters from input data.

Next, as preprocessing of the semi-formatting processing, the format processing unit 4 calculates characteristic parameter related to the stroke as the input data. The calculation of the characteristic parameter is carried out by, for example, extracting coordinate values of a plurality of representative points RPs from a stroke constituted of a consecutive dot sequence. FIG. 4 is a diagram showing a state where the plurality of representative points RPs are extracted as the characteristic parameters from the input data.

Figure 5:
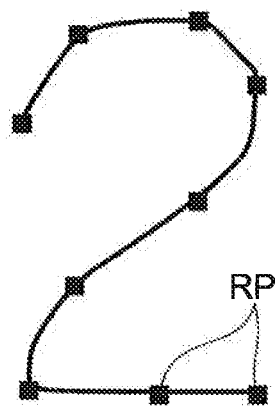
FIG. 5 A diagram showing an example of formatting example data of a character "2".

Here, the storage 3 stores in advance formatting example data that is to be an example for formatting input data. In the formatting example data, characteristic parameters are calculated in advance so that the processing in formatting can be carried out with ease. FIG. 5 is a diagram showing an example of the formatting example data of the character "2".

Characters that are written by a calligraphy teacher and sold by a dealer may be purchased and used as the formatting example data, or formatting example data in which the user writes up and stores characters to use in advance may be used.

Figure 6:
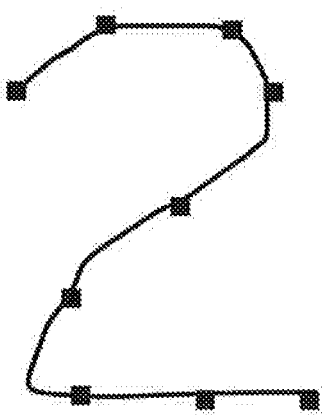
FIG. 6 An example of semi-formatted data generated by a correction.

Next, the format processing unit 4 compares the characteristic parameter of the input data and the characteristic parameter of the formatting example data, corrects the input data so that the stroke of the input data approaches that of the formatting example data, and generates semi-formatted data. FIG. 6 is an example of the semi-formatted data generated by the correction. As shown in the figure, in the semi-formatted data, characters handwritten-input by the user are made to approach the formatting example data and corrected to an easy-to-read form while leaving a handwriting nuance.

Here, as the characteristic parameters, a case of using normalized coordinate values of n (n is a positive number) representative points RPs on a stroke will be discussed. It should be noted that the normalization used herein refers to, for example, an affine transformation that is performed to make sizes of a bounding box surrounding the stroke of the input data (rectangle surrounding dot sequence of stroke) and a bounding box surrounding a stroke of the formatting example data match.

At this time, when the characteristic parameter of the formatting example data is represented by Pi ($0 \leq i < n$), the characteristic parameter of the input data is represented by Qi, and the correction coefficient is represented by k ($0 < k < 1$), the characteristic parameter Ri of the semi-formatted data obtained after the correction can be obtained by the following expression.

$$Ri = kPi + (1-k)Qi$$

The correction coefficient k may be the same for all the representative points RPs, or the correction coefficient k may be varied based on a distance |Pi−Qi| between the characteristic parameter of the input data and the characteristic parameter of the formatting example data so that processing of intensifying the correction is carried out for the distant representative point RP.

Finally, the format processing unit 4 causes the stroke of the semi-formatted data generated by the correction to be displayed on the screen of the display apparatus 300 via the display controller 5.

Heretofore, the basic idea of the semi-formatting processing has been described.

Modified Example 3 (Correction Method that does not Use Correction Coefficient k)

In the descriptions above, the method of using the correction coefficient k in the correction in the semi-formatting has been described. However, other methods that do not use the correction coefficient k may be used to generate semi-formatted data. In this case, the following affine transformation $$Ri = AQi + b \quad (A \text{ represents a line, and } b \text{ represents a vector})$$

may be performed on the characteristic parameter Qi of the input data such that the following expression expressing a sum of the distance between the characteristic parameter Pi of the formatting example data and the characteristic parameter Ri of the semi-formatted data becomes minimum.

$$\sum_{i=0}^{n-1} |P_i - R_i| \qquad \text{[Math. 2]}$$

Modified Example 4 (Update of Formatting Example Data)

Although the prepared formatting example data is not updated automatically in the descriptions above, the structure is not limited thereto, and a structure in which the data is automatically updated may also be used. For example, a plurality of characteristic parameters of marks (characters and figures) handwritten-input by the users are recorded in advance, and the past characteristic parameters of the users are compared with the characteristic parameter of the formatting example data. Then, data whose distance from the characteristic parameter of the formatting example data is small may be newly used as the formatting example data.

<Auxiliary Processing Carried Out During Consecutive Inputs>

When a plurality of marks (characters and figures) are input consecutively, processing for a parallel movement, enlargement and contraction, and the like may be additionally performed for each mark before or after the semi-formatting processing described above for suppressing variations in the sizes of areas occupied by the marks, central coordinates, intervals, and the like.

Figure 7:
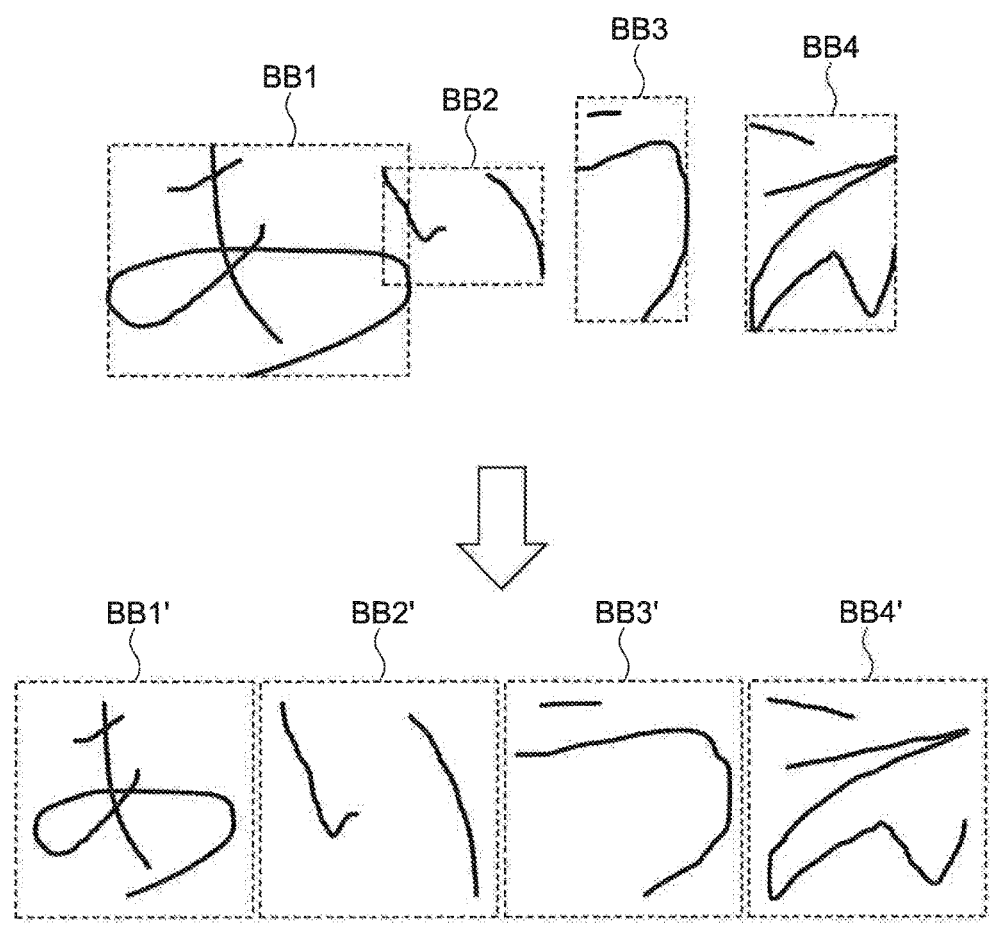
FIG. 7 A diagram showing a state of processing of performing parallel movement or enlargement and contraction processing on bounding boxes BB1 to BB4 of respective characters and adjusting sizes, central coordinates, and intervals of the bounding boxes BB1 to BB4.

FIG. 7 is a diagram showing a state of processing of performing parallel movement or enlargement and contraction processing on bounding boxes BB1 to BB4 of respective characters and adjusting sizes, central coordinates, and intervals of the bounding boxes BB1 to BB4. By this processing, the handwritten input characters are aligned as in bounding boxes BB1' to BB4' shown on the lower side of the figure.

[Basic Processing Flow]

Figure 8:
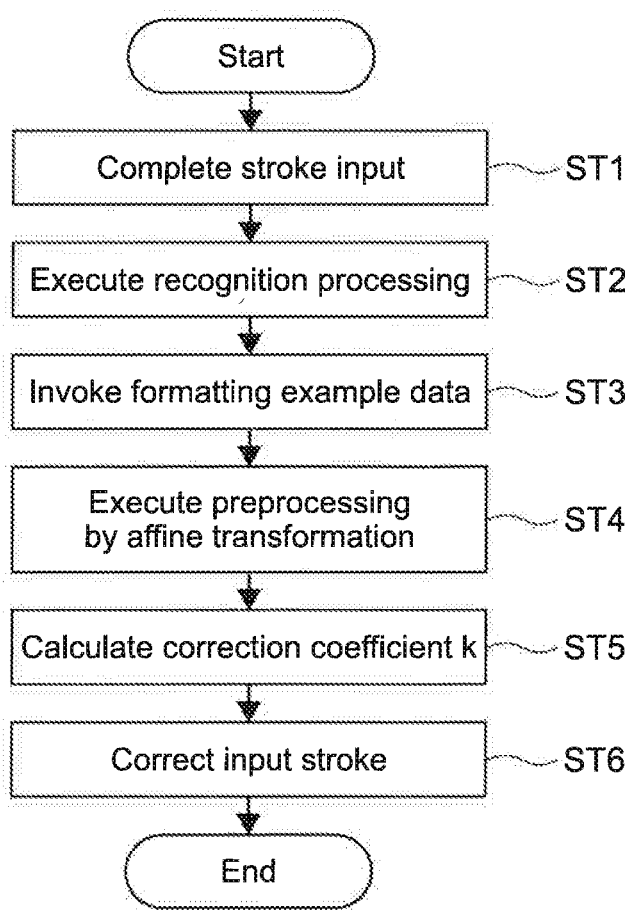
FIG. 8 A flowchart showing a flow of basic processing carried out by the information processing apparatus 100 of an embodiment.

Next, a basic processing flow will be described. FIG. 8 is a flowchart showing the basic processing flow carried out by the information processing apparatus 100 of an embodiment.

First, the input controller 1 accepts a stroke input to the input apparatus 200 by the user as input data. The accepted input data is supplied to the recognition processing unit 2 and the format processing unit 4 (Step ST1).

Next, the recognition processing unit 2 acquires pattern recognition data from the storage 3 and carries out recognition processing of the input data supplied from the input controller 1 to convert it into mark identification information including a character code and figure data (Step ST2).

Next, the format processing unit 4 invokes formatting example data corresponding to the mark identification information including a character code and figure data, that has been supplied from the recognition processing unit 2, from the storage 3 (Step ST3).

Next, for normalizing the formatting example data according to the input data, the format processing unit 4 carries out preprocessing by an affine transformation (Step ST4).

Subsequently, the format processing unit 4 sets the correction coefficient k (Step ST5).

The correction coefficient k may be a value preset by the system, a value set by the user, or a value that is set statically or dynamically.

Finally, the format processing unit 4 generates semi-formatted data by performing a correction by the semi-formatting processing of the input data (input stroke) based on the set correction coefficient k and the formatting example data subjected to the affine transformation. The generated semi-formatted data is displayed on a display screen of the display apparatus 5 via the display controller 5 (Step ST6).

Heretofore, the basic processing flow carried out by the information processing apparatus 100 has been described.

[Setting Method of Correction Coefficient k]

Next, a setting method of the correction coefficient k described above will be described. There are largely two methods for the setting method of the correction coefficient k. One is a method in which a user manually sets the correction coefficient k using a GUI (Graphical User Interface). The other is a method of automatically setting the correction coefficient k using a context (environment condition) used when a user inputs a stroke.

(Setting of Correction Coefficient k Using GUI)

Figure 9:
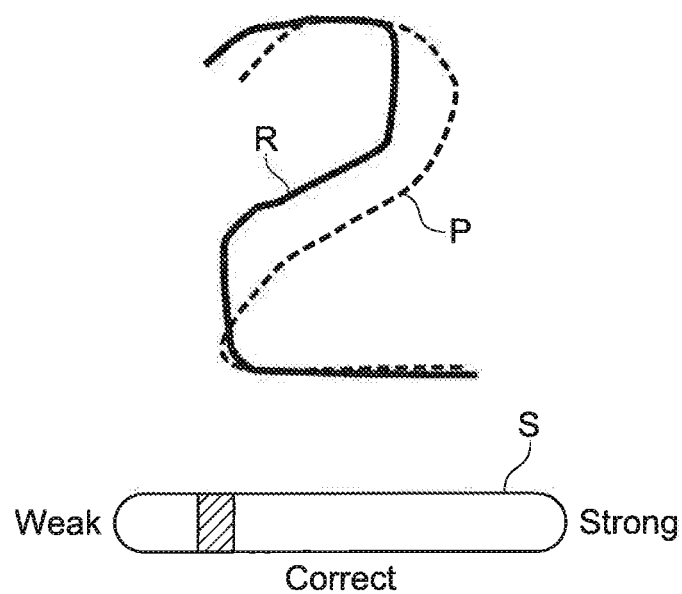
FIG. 9 A diagram showing an example of a GUI for setting a correction coefficient k, the diagram showing an example of setting the correction coefficient k by a slider S.
Figure 10:
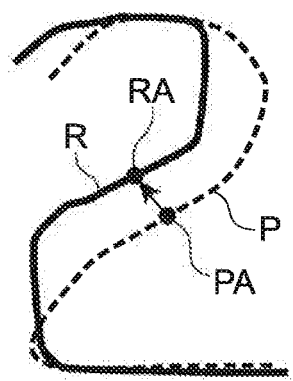
FIG. 10 A diagram showing an example of a GUI for setting the correction coefficient k, the diagram showing an example of setting the correction coefficient k by a user directly dragging a stroke R of semi-formatted data.

First, a setting method of the correction coefficient k using a GUI will be described. FIGS. 9 and 10 are diagrams each showing an example of a GUI for setting the correction coefficient k. FIG. 9 is a diagram showing an example of setting the correction coefficient k by a slider S, and a stroke R of the semi-formatted data approaches a stroke P of the formatting example data displayed on top of the stroke R as a position of a tab of the slider S moves toward the "strong" side.

FIG. 10 is a diagram showing an example of setting the correction coefficient k by the user directly dragging the stroke R of the semi-formatted data. The user holds a point RA on the stroke R of the semi-formatted data and drags it. Then, the format processing unit 4 calculates and sets the correction coefficient k from a distance between coordinates of the dragged point RA and coordinates of a point PA on the stroke P of the formatting example data corresponding to the point RA.

(Entire Flow in Setting Correction Coefficient k Using GUI)

Figure 11:
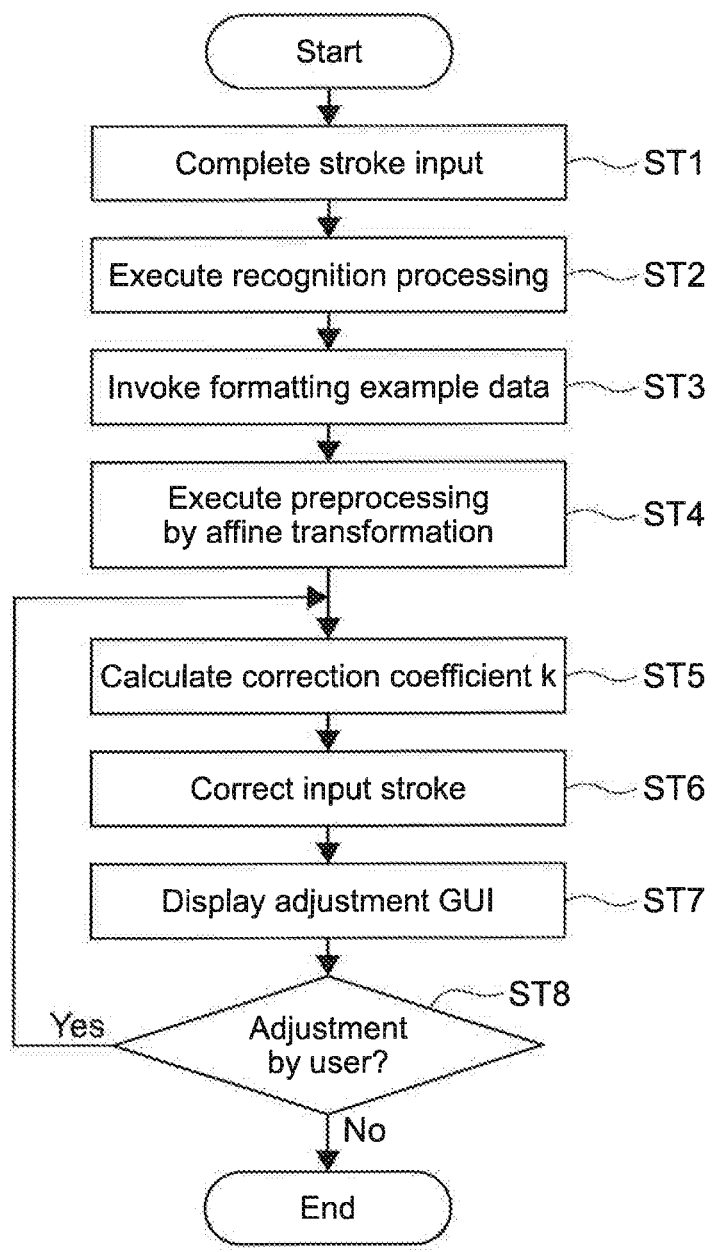
FIG. 11 A flowchart for explaining an entire flow in a case where the correction coefficient k is set using a GUI.

FIG. 11 is a flowchart for explaining an entire flow in a case where the correction coefficient k is set using a GUI. Since the processes from Step ST1 to Step ST6 are the same as those described above, descriptions thereof will be omitted. It should be noted that when Step ST5 is executed first, a value that is set in the information processing apparatus 100 as an initial value is used as the value of the correction coefficient k.

First, after the stroke R semi-formatted in Step ST6 by the correction coefficient k as the initial value is displayed on the screen, the format processing unit 4 causes a GUI for adjusting the correction coefficient k to be displayed on the display screen of the display apparatus 300 via the display controller 5 (Step ST7).

Next, the format processing unit 4 judges whether there has been an instruction from the user to adjust the correction coefficient k (Step ST8).

When there has been no instruction from the user (No in Step ST8), the format processing unit 4 ends the processing.

When there has been an instruction from the user (Yes in Step ST8), the format processing unit 4 returns to the processing of Step ST5, sets a value that is based on the instruction as the correction coefficient k, and continues the processing.

It should be noted that the correction coefficient k may be adjusted every time a handwritten input is made, or the same correction coefficient k may continuously be used as long as the user does not explicitly instruct the adjustment once the adjustment is made.

Heretofore, the entire flow in the case of setting the correction coefficient k using a GUI has been described.

(Setting of Correction Coefficient k Using Context (Environment Condition))

Next, a setting method of the correction coefficient k using a context (environment condition) will be described. An example of the context is a login ID that the user uses to log in to the information processing apparatus 100. By using such a login ID, the semi-formatting processing can be carried out using the correction coefficient k differently set for each user. It should be noted that the user currently making a handwritten input may be identified by a face recognition instead of the login ID.

Further, another example of the context is a type of application software to which the user inputs data by a handwritten input. For example, a correction may be weak in a hobby application and be strong in a business application.

Moreover, a type of the apparatus that the user uses may be used as the context. In this case, the correction may be strong in a portable terminal apparatus and be weak in a stationary apparatus such as a desktop PC.

Furthermore, whether to allow the input data to be viewed or not may also be used as the context. For example, the correction may be strong with respect to data to be viewed.

Further, the strongness and weakness of the correction may be adjusted by a character type to which the input data belongs, for example, alphabets, Chinese characters, Hiragana, Katakana, Arabic alphabets, Cyrillic alphabets, and Hangeul.

Moreover, an area for performing a handwritten input may be sectioned so that the value of the correction coefficient k can be adjusted independently for each of the sectioned areas.

Heretofore, the examples of the context for setting the correction coefficient k have been described.

(Entire Flow in Setting Correction Coefficient k Using Context (Environment Condition))

Figure 12:
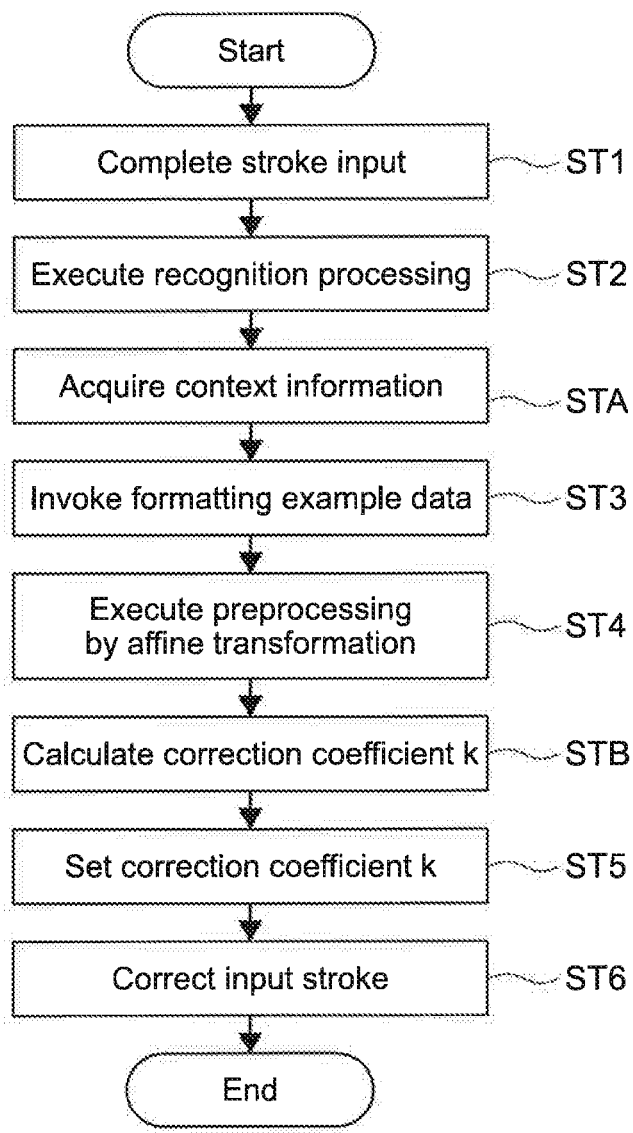
FIG. 12 A flowchart for explaining an entire flow in a case where the correction coefficient k is set using a context.

FIG. 12 is a flowchart for explaining an entire flow in a case where the correction coefficient k is set using a context. Since the processes from Step ST1 to Step ST6 are the same as those described above, descriptions thereof will be omitted.

First, after the recognition processing unit 2 carries out the recognition processing in Step ST2, the format processing unit 4 acquires context information (Step STA).

Then, after the format processing unit 4 performs the affine transformation in Step ST4, the format processing unit 4 calculates the correction coefficient k (Step STB).

It should be noted that in the descriptions above, Step STA is carried out after Step ST2, and Step STB is carried out after Step ST4. However, the order is not limited thereto, and Step STA and Step STB may be carried out at any time point as long as Step STA and Step STB are carried out in the stated order before the setting processing of the correction coefficient k of Step ST5.

Heretofore, the entire flow in the case where the correction coefficient k is set using a context has been described.

Modified Example 5 (Formatting of Recognition Candidate)

The semi-formatting processing of the present disclosure is basically carried out after the pattern recognition of a mark (character and figure). However, when the user explicitly tries a re-recognition in the case where the recognition processing is not carried out appropriately, a plurality of marks are presented to the user as recognition candidates, for example. At this time, a stroke obtained by subjecting the candidate mark to be presented to the semi-formatting processing may be presented, or a corresponding stroke of the formatting example data may be presented. Which of the strokes is to be presented may be designated by the user.

The present technology may be embodied as the following configurations.

(1) An image processing apparatus including:
an input device configured to receive a stroke input; and
a display controller configured to control a displaying of a modified stroke,
wherein the modified stroke is synthesized based on characteristic parameters of the received stroke input and characteristic parameters of a reference stroke that has been matched to the received stroke input.

(2) The image processing apparatus of (1), wherein the synthesized modified stroke is an interpolation result generated based on the characteristic parameters of the received stroke input and the characteristic parameters of the reference stroke, and the synthesized modified stroke falls between the received stroke input and the reference stroke.

(3) The image processing apparatus of (1) or (2), further includes: a recognition processing unit configured to match the reference stroke to the received stroke input.

(4) The image processing apparatus of any of (1) through (3), wherein the modified stroke is provided to the display controller from a server.

(5) An image processing method including:
controlling a reception of a stroke input;
controlling a determination of characteristic parameters of the received stroke input;
controlling a synthesizing of a modified stroke based on the characteristic parameters of the received stroke input and characteristic parameters of a reference stroke that has been matched to the received stroke input; and
controlling the modified stroke to be displayed.

(6) The image processing method of (5), wherein the synthesized modified stroke is an interpolation result generated based on the characteristic parameters of the received stroke input and the characteristic parameters of the reference stroke, and the synthesized modified stroke falls between the received stroke input and the reference stroke.

(7) The image processing method of (5) or (6), wherein the controlling the synthesizing of the modified stroke includes a comparison between the characteristic parameters of the received stroke input and the characteristic parameters of the matched reference stroke.

(8) The image processing method of any of (5) through (7), wherein the matched reference stroke is a determination result of a character recognition process performed upon the received stroke input.

(9) The image processing method of any of (5) through (8), wherein the matched reference stroke is a candidate, selected from a plurality of candidate strokes, that is most similar to the received stroke input.

(10) The image processing method of any of (5) through (9), wherein the characteristic parameters of the received stroke input include coordinate values of representative points along the received stroke input, and the characteristic parameters of the reference stoke include respective coordinate values of representative points along the reference stroke.

(11) The image processing method of any of (5) through (10), wherein the synthesized modified stroke represents a partial-correction of the received stroke input that is partially-corrected based on the matched reference stroke.

(12) The image processing method of any of (5) through (11), wherein the modified stroke is synthesized to satisfy the relationship $$Ri = kPi + (1-k)Qi$$

wherein characteristic parameters of the modified stroke is represented by Ri, the characteristic parameters of the reference stroke is represented by Pi, the characteristic parameters of the received stroke input is represented by Qi, and a correction coefficient is represented by k ($0 < k < 1$).

(13) The image processing method of any of (5) through (12), wherein k is defined based on an environmental condition existing when the stroke input is received.

(14) The image processing method of any of (5) through (13), wherein the characteristic parameters of the received stroke input and the characteristic parameters of the reference stroke are normalized by affine transformation.

(15) The image processing method of any of (5) through (14), wherein the received stroke input is a handwritten input that is input upon an input device.

(16) The image processing method of any of (5) through (15), wherein the received stroke input is a gesture input.

(17) The image processing method of any of (5) through (16), wherein the modified stroke is synthesized to maintain a stylistic characteristic of the received stroke input.

(18) A non-transitory computer-readable medium having embodied thereon a program, which when executed by a computer causes the computer to perform an image processing method, the method including:
controlling a reception of a stroke input;
controlling a determination of characteristic parameters of the received stroke input;
controlling a synthesizing of a modified stroke based on the characteristic parameters of the received stroke input and characteristic parameters of a reference stroke that has been matched to the received stroke input; and
controlling the modified stroke to be displayed.

(19) An image processing system including:
a terminal device configured to
receive a stroke input and
control a displaying of a modified stroke; and
a server device configured to
match a reference stroke to the received stroke input and
synthesize the modified stroke based on characteristic parameters of the received stroke input and characteristic parameters of the matched reference stroke.

(20) The image processing system of (19), wherein the synthesized modified stroke is an interpolation result generated based on the characteristic parameters of the received stroke input and the characteristic parameters of the matched reference stroke, and the synthesized modified stroke falls between the received stroke input and the matched reference stroke.

(21) An information processing apparatus, comprising
a processing unit configured to acquire input stroke data of a handwritten input mark and reference stroke data of the mark and synthesize the acquired input stroke data and the acquired reference stroke data.

(22) The information processing apparatus according to (21),
wherein the processing unit additionally acquires mark identification information obtained by a pattern recognition with respect to the input stroke data and acquires the reference stroke data based on the acquired mark identification information.

(23) The information processing apparatus according to (22),
wherein the processing unit performs the synthesis such that the following expression is satisfied when parameters expressing characteristics of the reference stroke data, the input stroke data, and stroke data as a result of the synthesis are represented by $P_i$, $Q_i$, and $R_i$ ($0 \leq i < n$, n is a positive number) and a correction coefficient is represented by k ($0 < k < 1$).

$$R_i = kP_i + (1-k)Q_i$$

(24) The information processing apparatus according to (23),
wherein the processing unit acquires an environment condition used when the user inputs the input stroke data and sets the correction coefficient based on the acquired environment condition.

(25) The information processing apparatus according to (23),
wherein the processing unit varies the correction coefficient based on a distance $|P_i - Q_i|$ between the parameter expressing the characteristics of the input stroke data and the parameter expressing the characteristics of the reference stroke data.

(26) The information processing apparatus according to (22),
wherein the processing unit performs an affine transformation $R_i = AQ_i + b$ (A represents a line, and b represents a vector) on $Q_i$ such that the following expression expressing a sum of a distance between $P_i$ and $R_i$ becomes minimum when parameters expressing characteristics of the reference stroke data, the input stroke data, and stroke data as a result of the synthesis are represented by $P_i$, $Q_i$, and $R_i$ ($0 \leq i < n$, n is a positive number).

$$\sum_{i=0}^{n-1} |P_i - R_i| \qquad \text{[Math. 3]}$$

(27) An information processing method, comprising:
acquiring, by a processing unit, input stroke data of a handwritten input mark and reference stroke data of the mark; and
synthesizing, by the processing unit, the acquired input stroke data and the acquired reference stroke data.

(28) An information processing program for causing a computer to function as
a processing unit configured to acquire input stroke data of a handwritten input mark and reference stroke data of the mark and synthesize the acquired input stroke data and the acquired reference stroke data.

[Supplementary Note]
In addition, the present disclosure is not limited to the embodiments described above and can be variously modified without departing from the gist of the present disclosure.

REFERENCE SIGNS LIST 1 input controller
2 recognition processing unit
3 storage
4 format processing unit
5 display controller
6 transceiver unit
100 information processing apparatus
101-103 server
200 input apparatus
300 display apparatus
400 electronic apparatus
500 terminal apparatus

The invention claimed is:
1. An image processing apparatus comprising:
an input device configured to receive a stroke input given by a user; and
a display controller configured to control a displaying of a modified stroke,
wherein the modified stroke is synthesized based on characteristic parameters of the received stroke input, characteristic parameters of a reference stroke that has been matched to the received stroke input, and a correction coefficient that has been set based on the user, wherein the characteristic parameters of the received stroke input comprise coordinate values of representative points along the received stroke input, and the characteristic parameters of the reference stroke comprise respective coordinate values of representative points along the reference stroke, and wherein the characteristic parameters of the reference stroke are normalized according to the characteristic parameters of the received stroke input.

2. The image processing apparatus of claim 1, wherein the synthesized modified stroke is an interpolation result generated based on the characteristic parameters of the received stroke input and the characteristic parameters of the reference stroke, and the synthesized modified stroke falls between the received stroke input and the reference stroke.

3. The image processing apparatus of claim 1, further comprising:
a recognition processing unit configured to match the reference stroke to the received stroke input.

4. The image processing apparatus of claim 1, wherein the modified stroke is provided to the display controller from a server.

5. An image processing method comprising:
controlling a reception of a stroke input given by a user;
controlling a determination of characteristic parameters of the received stroke input;
controlling a synthesizing of a modified stroke based on the characteristic parameters of the received stroke input, characteristic parameters of a reference stroke that has been matched to the received stroke input, and a correction coefficient that has been set based on the user; and
controlling the modified stroke to be displayed,
wherein the characteristic parameters of the received stroke input comprise coordinate values of representative points along the received stroke input, and the characteristic parameters of the reference stroke comprise respective coordinate values of representative points along the reference stroke, and
wherein the characteristic parameters of the reference stroke are normalized according to the characteristic parameters of the received stroke input.

6. The image processing method of claim 5, wherein the synthesized modified stroke is an interpolation result generated based on the characteristic parameters of the received stroke input and the characteristic parameters of the reference stroke, and the synthesized modified stroke falls between the received stroke input and the reference stroke.

7. The image processing method of claim 5, wherein the controlling the synthesizing of the modified stroke comprises a comparison between the characteristic parameters of the received stroke input and the characteristic parameters of the matched reference stroke.

8. The image processing method of claim 5, wherein the matched reference stroke is a determination result of a character recognition process performed upon the received stroke input.

9. The image processing method of claim 8, wherein the matched reference stroke is a candidate, selected from a plurality of candidate strokes, that is most similar to the received stroke input.

10. The image processing method of claim 5, wherein the synthesized modified stroke represents a partial-correction of the received stroke input that is partially-corrected based on the matched reference stroke.

11. The image processing method of claim 5, wherein the modified stroke is synthesized to satisfy the relationship $$Ri=kPi+(1-k)Qi$$

wherein characteristic parameters of the modified stroke is represented by $Ri$, the characteristic parameters of the reference stroke is represented by $Pi$, the characteristic parameters of the received stroke input is represented by $Qi$, and the correction coefficient is represented by $k$ ($0<k<1$).

12. The image processing method of claim 11, wherein k is defined based on an environmental condition existing when the stroke input is received.

13. The image processing method of claim 5, wherein the characteristic parameters of the received stroke input and the characteristic parameters of the reference stroke are normalized by affine transformation.

14. The image processing method of claim 5, wherein the received stroke input is a handwritten input that is input upon an input device.

15. The image processing method of claim 5, wherein the received stroke input is a gesture input.

16. The image processing method of claim 5, wherein the modified stroke is synthesized to maintain a stylistic characteristic of the received stroke input.

17. A non-transitory computer-readable medium having embodied thereon a program, which when executed by a computer causes the computer to perform an image processing method, the method comprising:
controlling a reception of a stroke input given by a user;
controlling a determination of characteristic parameters of the received stroke input;
controlling a synthesizing of a modified stroke based on the characteristic parameters of the received stroke input, characteristic parameters of a reference stroke that has been matched to the received stroke input, and a correction coefficient that has been set based on the user; and
controlling the modified stroke to be displayed,
wherein the characteristic parameters of the received stroke input comprise coordinate values of representative points along the received stroke input, and the characteristic parameters of the reference stroke comprise respective coordinate values of representative points along the reference stroke, and
wherein the characteristic parameters of the reference stroke are normalized according to the characteristic parameters of the received stroke input.

18. An image processing system comprising:
a terminal device configured to
receive a stroke input given by a user, and
control a displaying of a modified stroke; and
a server device configured to
match a reference stroke to the received stroke input, and
synthesize the modified stroke based on characteristic parameters of the received stroke input, characteristic parameters of the matched reference stroke, and a correction coefficient that has been set based on the user,
wherein the characteristic parameters of the received stroke input comprise coordinate values of representative points along the received stroke input, and the characteristic parameters of the reference stroke comprise respective coordinate values of representative points along the reference stroke, and wherein the characteristic parameters of the reference stroke are normalized according to the characteristic parameters of the received stroke input.

19. The image processing system of claim 18, wherein the synthesized modified stroke is an interpolation result generated based on the characteristic parameters of the received stroke input and the characteristic parameters of the matched reference stroke, and the synthesized modified stroke falls between the received stroke input and the matched reference stroke.

20. The image processing method of claim 5, wherein the correction coefficient is set to a same value for all representative points.

21. The image processing method of claim 5, wherein the correction coefficient is varied based on a distance between respective characteristic parameters of the received stroke input and respective characteristic parameters of the reference stroke.

22. The image processing method of claim 5, wherein the correction coefficient is manually set by the user.

\* \* \* \* \*